United States Patent
Hartley

(10) Patent No.: US 6,813,566 B2
(45) Date of Patent: Nov. 2, 2004

(54) METHOD OF PRODUCING CONTINUOUS, ORTHOGONAL SIGNALS AND METHOD OF THEIR USE FOR EXAMINING AND FOR DETECTING CHANGES IN A BODY

(75) Inventor: Bruce Hartley, Subiaco (AU)

(73) Assignee: Curtin University of Technology, Bentley (AU)

( * ) Notice: Subject to any disclaimer, the term of this patent is extended or adjusted under 35 U.S.C. 154(b) by 0 days.

(21) Appl. No.: 10/366,007

(22) Filed: Feb. 12, 2003

(65) Prior Publication Data

US 2003/0154030 A1 Aug. 14, 2003

(30) Foreign Application Priority Data

Feb. 13, 2002 (AU) .............................................. PS0511

(51) Int. Cl.⁷ ................................................ G01V 1/28
(52) U.S. Cl. ........................................................ 702/18
(58) Field of Search .............................. 702/7, 14, 16, 702/17, 18; 324/335

(56) References Cited

U.S. PATENT DOCUMENTS

| | | | | | |
|---|---|---|---|---|---|
| 4,042,910 A | * | 8/1977 | Rietsch | ........................ | 367/40 |
| 4,159,463 A | * | 6/1979 | Silverman | ..................... | 367/59 |
| 4,715,020 A | * | 12/1987 | Landrum, Jr. | ................ | 367/38 |
| 4,823,326 A | * | 4/1989 | Ward | ............................ | 367/41 |
| 4,969,129 A | * | 11/1990 | Currie | ........................... | 367/41 |
| 5,410,517 A | * | 4/1995 | Andersen | ..................... | 367/75 |
| 5,721,710 A | * | 2/1998 | Sallas et al. | ................. | 367/41 |
| 6,161,076 A | * | 12/2000 | Barr et al. | .................... | 367/43 |

* cited by examiner

Primary Examiner—Donald McElheny, Jr.
(74) Attorney, Agent, or Firm—Needle & Rosenberg, P.C.

(57) ABSTRACT

A method is disclosed for examining a body by transmitting the N continuous orthogonal signals, generated in accordance with the disclosed method, into the body and providing receivers for receiving and recording the N signals including reflections of the N continuous signals from one or more reflectors within the body. The travel-time to the reflectors for each of the N signals at each of the receivers is determined by cross correlating each of the N signals with each of the recorded signals at the receivers.

21 Claims, 19 Drawing Sheets

Figure 1. Earth reflectivity model showing time-dependent change for (a) primary and (b) secondary surveys. The reflection coefficient at 2.350 s has been reduced from 1.0 to 0.6 between surveys.

Figure 2. The signals transmitted from (a) source 1 and (b) source 2 are illustrated for one repeat length. Source 1 is generated from all the odd-indexed prime frequencies between 1000 and 5000 Hz, while source 2 is constructed from all the even-indexed prime frequencies (scaled back to 100 to 500 Hz).

Figure 4. Travel time to the subsurface change determined from stacked cross correlations of (a) differenced signal with signal 1, (b) differenced signal with signal 2, and (c) stack of (a) and (b). The correlation peak gives a travel time of 2.250 s with a signal to noise ratio of 36:1.

Figure 5. The change in reflectivity amplitude between surveys is determined from the ratio of the amplitude spectra of (a) signal 1 and (b) the differenced signal stacked over the repeat length of signal 1. The change of amplitude is 0.400 consistent with the reflectivity decrease from 1.0 to 0.6.

Figure 6. Numerical back propagation is performed with the suppression of continuous sinusoids reconstructed from the entire range of mutually prime frequencies. The input signal clearly illuminates a reflector at time 2.350 s.

Figure 8. Simple velocity model for Example 1 with right hand circle modified in velocity.

Figure 9. Equilibrium Back-propagated Wavefield for Example 1 with frequency of 200 Hz Figure 11. Equilibrium Back-propagated Wavefield for Example 1 with mixed frequencies of 100-400 Hz. The peak Energy is over 100 units and the background has been clipped below a value of 1.5.

Figure 12. Granular model for Example 2.

Figure 13. Granular model with modified velocity in a circular area at grid location {150,350}.

Figure 15. Equilibrium Back-propagated Wavefield for Example 2 with frequency of 400 Hz Figure 16. Equilibrium Back-propagated Wavefield for Example 2 with mixed frequencies of 100-400 Hz. The peak energy is over 100 units and the background has been clipped below a value of 1.5.

METHOD OF PRODUCING CONTINUOUS, ORTHOGONAL SIGNALS AND METHOD OF THEIR USE FOR EXAMINING AND FOR DETECTING CHANGES IN A BODY

CROSS REFERENCE TO RELATED APPLICATIONS

The present application claims priority to Australian Patent Application No. PS0511, filed Feb. 13, 2002, which application is incorporated herein fully by this reference.

FIELD OF THE INVENTION

The present invention relates to a method of producing continuous orthogonal signals and a method of their use for detecting changes in a body, and in particular, but not exclusively, to a method of using said signals in reflection seismology.

BACKGROUND OF THE INVENTION

Reservoir engineers and oil production engineers are interested in the changes that take place in the subsurface when oil or gas is being extracted from reservoirs. The knowledge of changes which are taking place can assist in maximising production from reservoirs and for managing the extraction.

To satisfy this need for information, techniques have been developed for re-surveying a reservoir using seismic techniques whilst attempting to reproduce the original survey. However inherent limitations militate against exact repetition of a survey. Accordingly, re-surveying with current equipment is difficult and the results are affected by uncontrolled and uncontrollable global changes that can obscure local changes in the subsurface which are of economic interest.

For example, a typical surveying method utilises a Vibroseis truck or marine air-gun and an array of geophones which are placed on the ground. The Vibroseis truck produces vibrations which are transmitted through the ground to set up seismic waves. These waves travel through the subsurface and are reflected at seismic boundaries where there is a change in rock properties. The boundaries are often termed as "reflectors". The travel time to these reflectors is measured from the reflected signal. Provided that a velocity model, or the rock type in the subsurface is known, it is possible to determine the distance to a reflector and so build up a model of the subterranean rock structure.

In order to re-survey the area in question, to build up a picture of the changes which may occur, for example during the extraction of oil, it will be necessary to ensure that the Vibroseis or air-gun is positioned at the same location for each survey, that the mechanical vibrations produced are the same between surveys and that geophones for picking up reflected seismic waves are in the same position between surveys and further to ensure that other conditions between surveys are identical.

In practice, this is virtually impossible making the results of the re-surveying imprecise.

SUMMARY OF THE INVENTION

The present invention was developed with a view to overcoming the above described problems in relation to surveying the subsurface. However, embodiments of the invention are not limited to geological application and can be used for examining, and/or detecting changes in, other bodies such as for non-destructive testing of man-made structures or for use in medical ultrasound or natural seismology.

According to one aspect of the present invention there is provided a method of producing N continuous orthogonal signals including the steps of:

for each of said N signals, summing a plurality of constituent sine waves together, where each of said sine waves has a known and mutually exclusive frequency and, said sine waves have a random or pseudo-random phase, and wherein no two of said N signals includes constituent sine waves of the same frequency.

Preferably each of said constituent sine waves has a prime number integer frequency.

Preferably said method further includes scaling the frequencies of said constituent sine waves to a predetermined bandwidth.

Preferably said method includes forming each of said N signals with an extended repeat length.

Preferably said method includes forming each of said N signals with a different repeat length.

Preferably the phases of each of the component sine waves are arranged such that frequencies in any of the N signals will not have a phase which causes large reinforcements of amplitude at any time within the repeat length of the N signals.

According to a further aspect of the present invention there is provided a method of examining a physical body including the steps of:

forming N continuous orthogonal signals where N is an integer $\geq 1$ by, for each of said N signals, summing a plurality of constituent sine waves together, where each of said sine waves has a known and mutually exclusive frequency and, said sine waves have a random or pseudo-random phase, and wherein no two of said N signals includes constituent sine waves of the same frequency transmitting said N signals into said physical body;

providing M receivers for receiving said continuous signals including reflections of said continuous signals from one or more reflectors within said physical body and recording said received signals at each of said M receivers;

determining a travel-time to the reflectors for each of said N signals at said M receivers by cross correlating each of said N signals with each of said recorded signals at said M receivers; and, deriving an image of said physical body from said determined travel-times.

In one embodiment, said step of transmitting said N signals includes transmitting each of said N signals from respective separate sources.

Preferably said step of cross correlating includes cross correlating said respective signals using a correlation window of a width greater than one half of the repeat length of the shortest repeat length of said signals and summing said windowed correlations for a length equal to the product of the repeat lengths of said N signals.

Preferably said step of determining travel-time includes, for each recorded signal, windowing said recorded signal, cross correlating said recorded signal with each of said N signals, and summing separate windows of said recorded data.

Alternately, said step of determining travel-time includes at each of said M receivers, windowing the recorded data, summing said recorded data for the repeat length of the Nth signal and cross correlating said summed record with said source signal.

In an alternate embodiment, the step of transmitting said N signals includes summing each of said N signals to form a composite signal and transmitting said composite signal from a single signal source.

In this embodiment, said step of determining travel-time includes, for a particular one of said N signals constituting said composite signal;

summing said received signal at each of said M receivers for a repeat length of said particular one of said N signals; and, correlating said summed signal with said particular one of said N signals.

According to a further aspect of the present invention there is provided a method of detecting changes in a physical body including the steps of:

forming N continuous orthogonal signals in accordance with the first aspect of the present invention where N is an integer $\geq 1$ by, for each of said N signals, summing a plurality of constituent sine waves together, where each of said sine waves has a known and mutually exclusive frequency and, said sine waves have a random or pseudo-random chase, and wherein no two of said N signals includes constituent sine waves of the same frequency transmitting said N signals into a physical body;

providing M receivers for receiving said continuous signals including reflections of said continuous signals from one or more reflectors within said physical body and recording said received continuous signals at said M receivers times T and T+$\Delta$; and, deriving M differenced signals by subtracting said recorded signals at time T from said recorded signal at time T+$\Delta$ to provide an indication of changes in said body, based on said M differenced signals.

Preferably said method includes analysing said differenced signals in amplitude and phase.

Preferably said method includes back propagating said differenced signal to produce an image in time of changes in said body.

Preferably such back propagation can be achieved by phase conjugation of the differenced signal which is equivalent to time reversal.

Alternately, said method includes, providing a velocity field of said body, and back propagating said differenced signal through said velocity model to produce a spatial image of the changes in said physical body.

BRIEF DESCRIPTION OF THE DRAWINGS

An embodiment of the present invention will now be described by way of example only with reference to the accompanying drawings in which.

DESCRIPTION OF PREFERRED EMBODIMENTS

Figure 2:
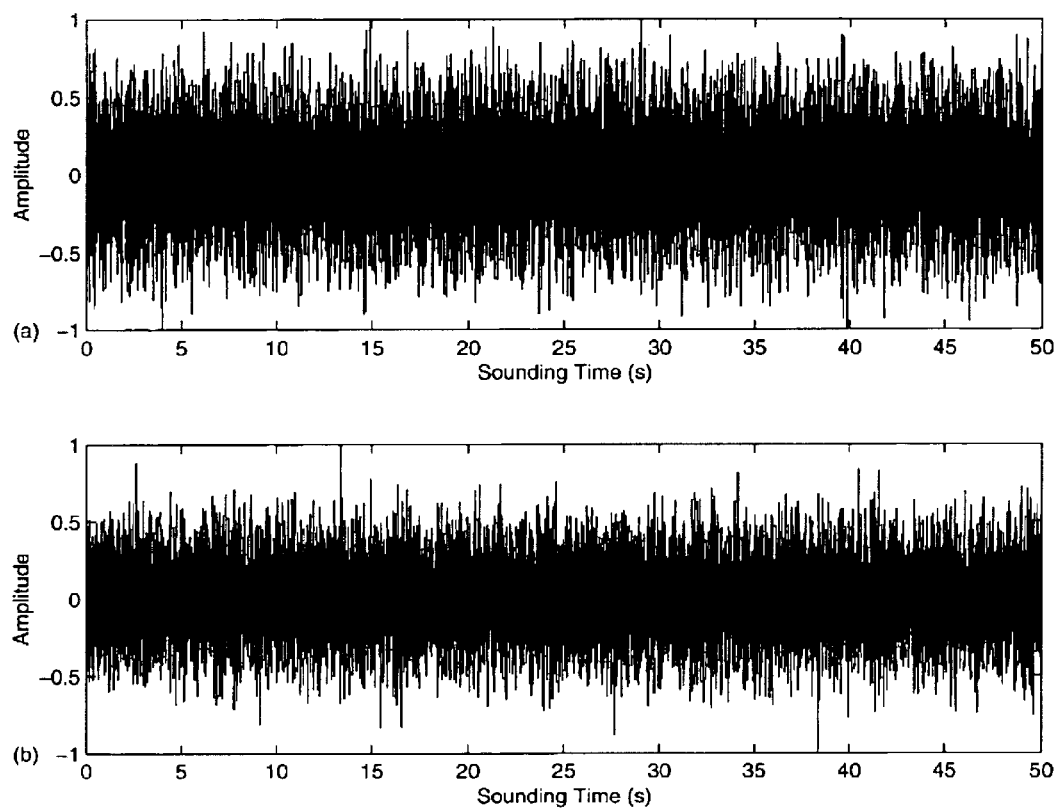
FIGS. 2a and 2b depict signals transmitted from continuous acoustic wave sources S1 and S2 used in an embodiment of said method.
Figure 3:
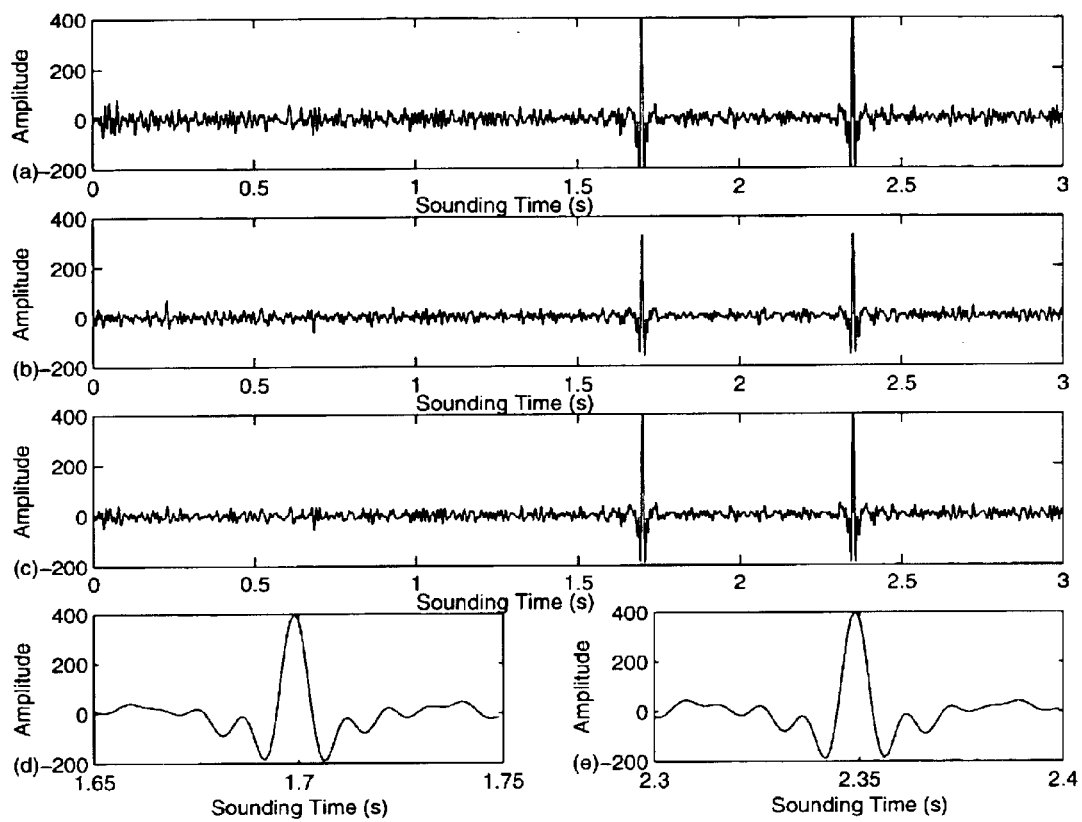
FIG. 3a depicts a summed cross correlation of a signal received at a receiver with signal S1.
FIG. 3b illustrates a summed cross correlation of a signal received at the receiver with signal S2.
FIG. 3c illustrates a Sum of the signals depicted in FIGS. 3a and 3b.
FIG. 3d is an enlarged view of a correlation peak of FIG. 3c at 0.170 seconds.
FIG. 3e is an enlarged view of a correlation peak in FIG. 3c at 2.350 seconds.
Figure 4:
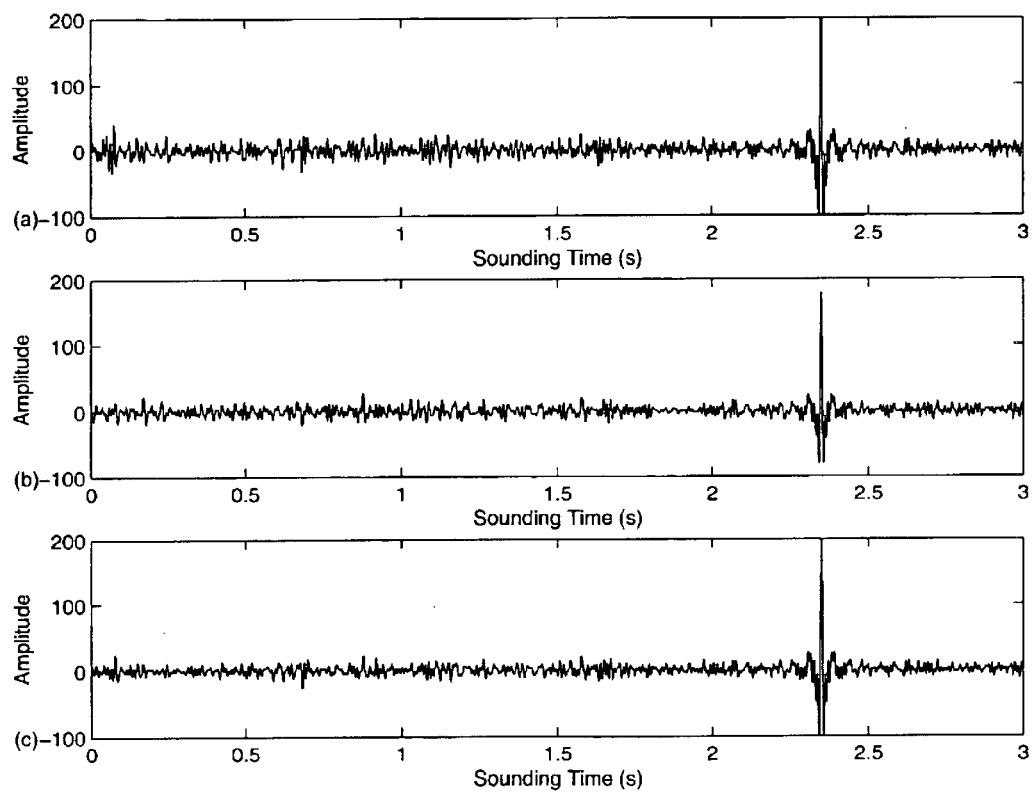
FIG. 4a depicts the summed cross correlation of a differenced signal with signal S1.
FIG. 4b illustrates the summed cross correlation of a differenced signal with signal S2.
FIG. 4c illustrates the Sum of signals shown in FIGS. 4a and 4b.
Figure 5:
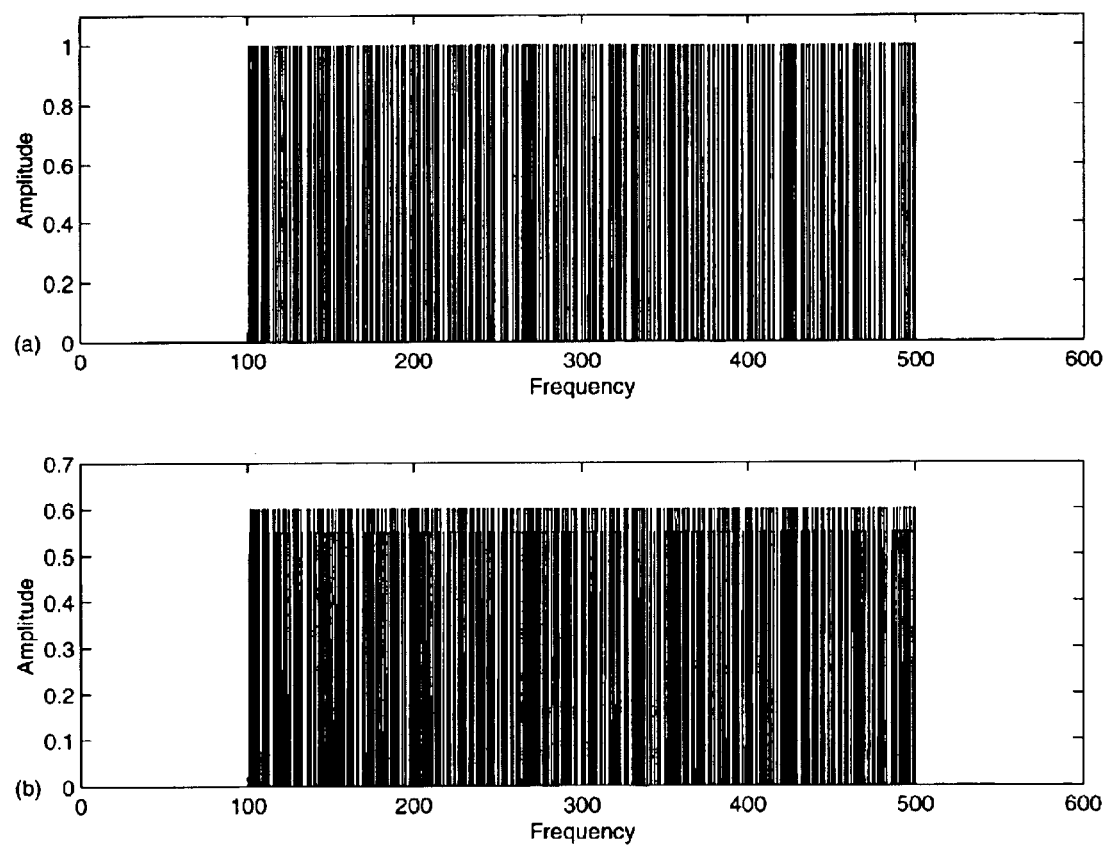
FIG. 5a is the amplitude spectrum of signal S1 summed over the repeat length of signal S1.
FIG. 5b is the amplitude spectrum of the differenced signal attributable to signal S1 after changes have occurred in the Earth reflectivity model.
Figure 17:
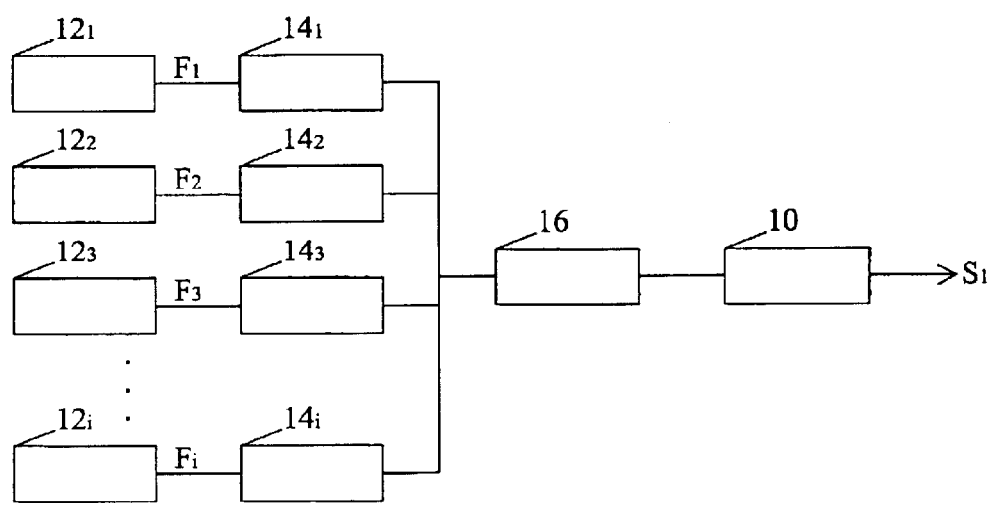
FIG. 17 is a flow diagram showing a method of generating continuous orthogonal signals which are used for the purposes of examining a physical body in accordance with an embodiment of the present invention.

In an embodiment of the present method, N different sources are used for emitting respective unique continuous acoustic signal, where N is an integer 1. The signals from each source are structured to be mutually orthogonal. As shown in FIG. 17, this can be achieved by synthesising the signal from each source from a plurality of discrete, mutually prime frequencies $F_1$–$F_i$, generated by respective frequency generators $12_1$–$12_i$, where no source has a constituent signal of the same frequency. For example, a source of signal S1 can be generated from a plurality of sine waves having odd indexed, mutually prime frequencies and arranged between 1000 and 5000 Hz while a signal transmitted a second source of signal S2 can be formed from sine waves having even indexed, mutually prime frequencies between 1000 and 5000 Hz. Ideally, the constituent sine waves or signals in each source are formed with a random or pseudo random phase. This is achieved by adding a random phase to each of the constituent frequencies $F_1$–$F_i$ of the signal S1 via respective phase randomisers $14_1$–$14_i$. The random phase frequencies are then combined by a summer 16 to produce the signal S1. The randomising of the phase of the constituent sine waves for each of the N signals is to the extent that there is no significant reinforcement of the constituent waves. This can be achieved by providing each constituent sine wave with a known phase and selecting the phases to ensure no significant reinforcement, rather than providing each sine wave with a random phase. Randomising the phase limits the instantaneous power which would be required in injecting the signals into a body under examination. When used in a reflection seismology application where the signals S1 and S2 are acoustic or elastic waves the signals are thus required to be in the acoustic bandwidth. Accordingly the constituent signals from which they are made are scaled back to a bandwidth of 100 to 500 Hz. The signals S1 and S2 are formed with an extended repeat length many times the repeat length of its constituent waves. Further, conveniently, the signals S1 and S2 are also formed with different repeat lengths. For example, the signal S1 may have a repeat length of $5\times10^4$ samples while signal S2 has a repeat length of $7\times10^4$ samples. The S1 and S2, illustrated in FIGS. 2a and 2b simulate white or coloured noise. Due to the mutually orthogonal nature of the signals S1 and S2, the cross correlation between the signals yields a 0 result. The transmitted signals from the sources become the reference signals for subsequent correlation and phase relationship processing.

Huygen's Principle is the basis for understanding the use of the continuous orthogonal waves to detect changes in a body such as the subsurface. This can be understood by assuming that every element of a medium insonified with acoustic waves acts as a secondary source. The sum of the waves from all these sources, taking proper account of phase, amplitude and directionality, as well as the acoustic velocities in the medium, defines the wave field. It follows that if any element in the medium changes, the changes in the wave field is characteristic of a signal which emanates from that changed element. If we were to record that change in the wavefield with a sufficient number of detectors and, if we knew the velocity of acoustic waves at all points in the medium, we would be able to construct a wavefield which would focus exactly onto the element in the medium which had changed. In order to achieve this focussing all that is required is to record the original wavefield of the unaltered medium, then record the wavefield of the changed medium. The difference is the wavefield due to the change. This can be done using a selected range of frequencies. The differenced signal is phase conjugated and then back propagated into the medium to focus exactly onto the changed element. The phase conjugation is equivalent to time reversal.

In the reflection seismology applications the signals S1 and S2 are ideally of low power for example in the order of tens to hundreds of watts, with a likely maximum of a kilowatt, (as distinct from the higher powers used with say the conventional Vibroseis truck or explosive techniques). The low power of signals S1 and S2 facilitates the practical continuous injection of these signals into the ground from fixed location, which, over time, can provide the same or greater energy than that provided by Vibroseis or explosive sources. Having the sources at fixed location facilitates the reliable re-surveying of the subsurface.

Figure 18:
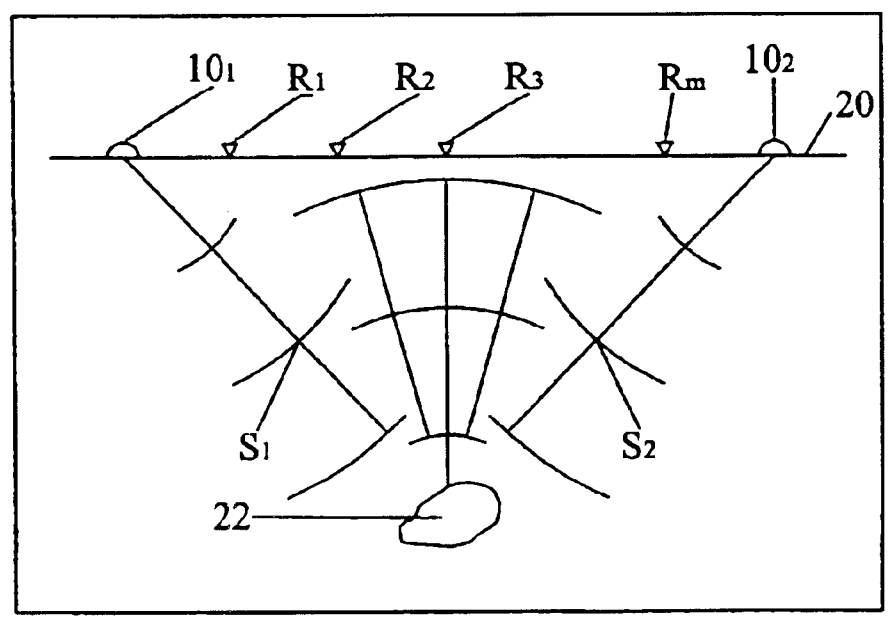
FIG. 18 illustrates application of an embodiment of the method for examining a body of ore, for the purposes of seismic surveying; and, FIG. 19 is a flow chart showing the steps in the method for examining the body.

Referring to FIG. 18, a plurality of receivers 18 in the form of very sensitive geophones are laid on the ground 20 and detect the signals S1 and S2. The detected signals may be directly received from the sources 101–10i or reflected from seismic boundary or reflector 22 within the subsurface. Signals from the receivers are amplified and analysed by lock-in amplifiers techniques or by digitising and comparing to the phase of a reference signal at a frequency at which analysis is required. As the source signals comprise more than one frequency, many frequencies may be simultaneously analysed using this technique. The recorded signals need to be analysed in terms of their amplitude and phase to allow quantitative interpretation of the changes in subsurface. Since the records are essentially characteristics of continuous sinusoidal waves they can be time reversed by phase conjugation.

For the case of N sources, when their respective signals are transmitted together, the response recorded at a particular receiver will have a repeat length equal to the product of the individual repeat lengths and the temporal sample rate. A differenced signal (or wave field) can be generated through a subtraction of the signal (i.e. wave field) recorded at a time T+Δ from the signals recorded at an initial time T. Assuming of course that there is a change in the subsurface between these time, the differenced signal will contain information relating to the change in the subsurface.

Traveltime from each reflector to each receiver is determined via a windowed crosscorrelation processing. The use of tapered window coefficients will reduce the effects of discontinuities at the ends of the window. As the window is incremented, the recorded signal is crosscorrelated with a reference signal producing a peak at the two-way traveltime of each reflection. Summing all windowed crosscorrelation will increase the signal-to-noise ratio as the traveltime peaks will constructively interfere while spurious correlations will not. This windowed crosscorrelation is performed against the signals from each of the N sources to produce a series of N traveltime determinations, together with the residual accidental autocorrelations of the source signal. Knowledge of the accidental autocorrelation of each source can then be used to further reduce noise by deconvolving with that known autocorrelation function. A final Sum of the series of N crosscorrelations yields a further reduction in the level of noise. The crosscorrelation procedure shares similarities with the extraction of travel times for Vibroseis signals except that the signal in the proposal here is continuous and not confined to a sweep of specified duration.

In a time-lapse environment, the traveltime recovery technique is the same except the recorded signal is simply replaced with the differenced signal.

The change in reflection amplitude between surveys (i.e. times T and T+Δ) is determined from a spectral analysis of the differenced and reference signals. The differenced signal is composed of the entire range of frequencies present in the N reference signals. The response due to any source signal is recoverable by dividing the differenced signal into compartments equal to the repeat length of the reference signal and Summing them together. The change in reflection amplitude is given by the ratio of the amplitude spectra of the summed differenced signal to the reference signal at each frequency component.

Figure 19:
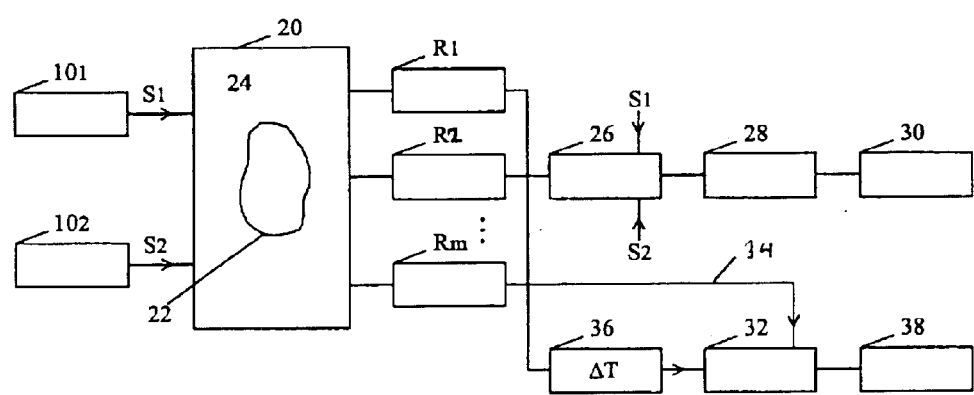

FIGS. 18 and 19 depict generally, the above described method as applied to seismic surveying. Sources 101 and 102 generate respective signals S1 and S2 which penetrate the ground and propagate through the subsurface 24 (see FIG. 19), striding and reflecting off subsurface boundaries or reflectors 22. Receivers $R_1$–$R_M$ receive and record the signals S1 and S2 after they have passed through the subsurface 24. The recorded signals are subject to data processing by a cross correlator 26 (see FIG. 19) which correlates the recorded received signals with the original source signals S1 and S2. The cross correlated signals are then further processed by data processor 28 (see FIG. 19) to produce the travel time from each reflector 22. Travel time information my then be fed to an imager 30 to produce an image of the subsurface 24 (see FIG. 19).

In order to detect to changes in the subsurface over time, the signals recorded at the receivers R1–Rm at different times are subtracted from each other. With reference to FIG. 19, the recorded signals are received as $R_1$–$R_M$ are in effect fed to a differencer 32 both directly along route 34 and via a time delay 36. The differenced signal will contain information relating to changes in the subsurface 22. In addition, as explained above, the differenced signal may drive a transmitter 38 for re-transmission of the different signal into the subsurface 24 to focus energy on the reflector 22.

Velocity model independent imaging can be performed with knowledge of the amplitude spectrum of the differenced signal and by measuring the phase change by reference to the known phase of each frequency component of the source signal. Calculation of the phase difference between signals is equivalent to a time reversal or phase conjugation procedure. Numerical back propagation is simulated by the superposition of continuous sinusoids reconstructed from the entire range of mutually prime frequencies. For each frequency component, the amplitude is equal to the amplitude of the differenced signal and the phase is given by the phase difference between the differenced signal and the reference signal. The superposition of these sinusoids yields a peak at the location of change in the subsurface, thus producing an image in time of the change in the subsurface without a prior knowledge of the Earth's velocity field. Alternatively, if the velocity field of the Earth is accurately known, the reconstructed signal can be back propagated through the model to produce an image of the subsurface change in depth.

Figure 1:
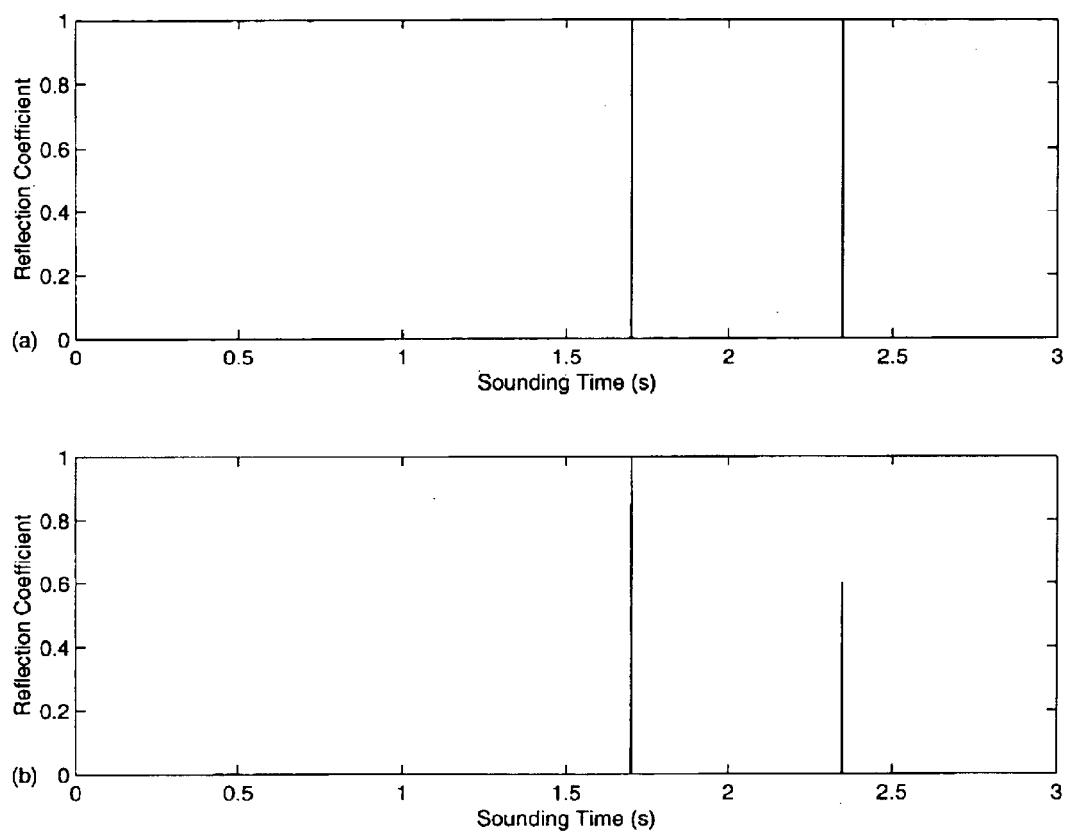
FIGS. 1a and 1b illustrate an earth reflectivity model at two different times, T and T+$\Delta$.

The method described above has been subjected to several tests. A first test has been conducted in 1-D by numerical modelling and is illustrated in FIGS. 1–6. The primary Earth model at time T in this test shows two reflectors with reflection coefficient 1 located at times 1.700 s and 2.350 s, as shown in FIG. 1a. The reflection coefficient at 2.350 s has been reduced to 0.6 for the secondary survey, at time T+Δ, as shown in FIG. 1b.

Two source signals were generated from prime frequencies between 1000 and 5000 Hz, scaled back to a bandwidth of 100 to 500 Hz. Every odd-indexed frequency was used for signal 1 and every even-indexed frequency used to general signal 2, with a random phase applied to each component. Signal 1 has a repeat length of $5 \times 10^4$ samples and signal 2 has a repeat length of $7 \times 10^4$ samples, as illustrated in FIGS. 2a and 2b respectively.

The repeat length of each signal is determined by its constituent scaled frequencies. More particularly, the repeat lengths of any particular signal will relate to the least common multiples of the constituent frequencies.

The applicability of the technique as an alternative to conventional seismic surveying is illustrated in FIGS. 3a–3e, where the traveltimes to each of the reflectors in the primary model (i.e. at time T) are recovered. The traveltime from each reflector to the receiver was correlated using a sliding window of length $2.5 \times 10^4$ samples (chosen to be half the repeat length of signal 1), giving a total of 24 windows. Ideally the window length should be at least one half of the repeat length of the shortest of the transmitted signals.

Each of the signals has a different repeat length however the two signals have a longer combined repeat length. If the window is taken as a fraction (say a half) of one of the signals after a number of windows equal in toto to the combined repeat length of the two signals, the correlations will repeat and therefore will not contribute further to the reduction in the signal to noise ratio. The number of repeat correlations which might be taken is related to the fraction of the repeat length of the one of the signals and to the total combined repeat length of the two signals. In the case shown the number of useful windows was 24.

The recorded response was measured for the duration of its repeat length, which is $3.5 \times 10^5$ samples. The peaks evident at 1.700 s and 2.350 s clearly highlight the travel-times to each of the reflectors. The travel-time peaks have correlation coefficients of 447 and 435 against an average background of less than 5, giving a signal-to-noise ratio of approximately 94:1.

To image the change in the subsurface, signals from both sources were simultaneously propagated through the primary and secondary velocity fields (i.e. at times T and T+Δ) and the difference in the recorded responses determined. The final summed cross correlations of the differenced signal with each reference signal are shown in FIGS. 4a and 4b respectively, together with the final summed cross correlation, in FIG. 4c. The peak at travel-time 2.350 s clearly shows the travel-time from the change in the medium to the receiver. The travel-time peak has a correlation coefficient of 220 against an average background of 6, giving a signal-to-noise ratio of approximately 36:1.

The change in reflectivity between the surveys at times T and T+Δ can be determined from a spectral analysis of the differenced and reference signals. The amplitude spectra of signal 1 is shown in FIG. 5a. The response due to signal 1 was recovered by Summing the differenced signal over the repeat length of signal 1. The amplitude spectrum of this recovered signal is shown in FIG. 5b. The ratio of the recovered response to signal 1 at each frequency component results in a value of 0.400, which is equal to the change in reflection strength from 1.0 to 0.6. The same technique applied to signal 2 gave an amplitude change of 0.400, although the absolute values of amplitude were different.

Figure 6:
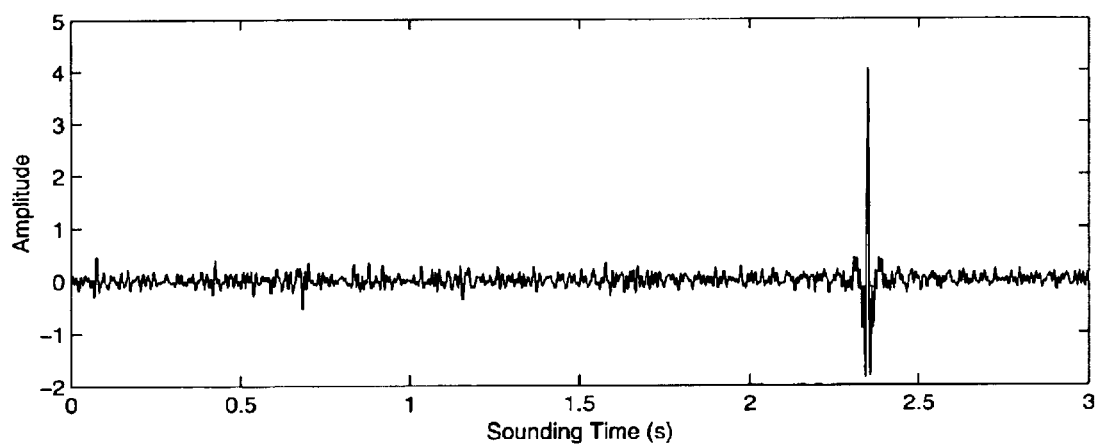
FIG. 6 illustrates the summed numerical backpropagation of the differenced signal.

Numerical backpropagation is performed by measuring, at each component frequency, the amplitude of the differenced signal together with the phase difference between the differenced signal and the reference signal. For each analysis window, a superposition of sinusoids with defined amplitude and phase were generated. The application of phase difference is equivalent to time reversal or phase conjugation, and sinusoid generation is equivalent to numerical backpropagation. FIG. 6 shows the numerical backpropagation of the signal summed over 24 windows. Energy is clearly refocused at time 2.350 s, providing a temporal image of the location of the reflection.

Figure 7:
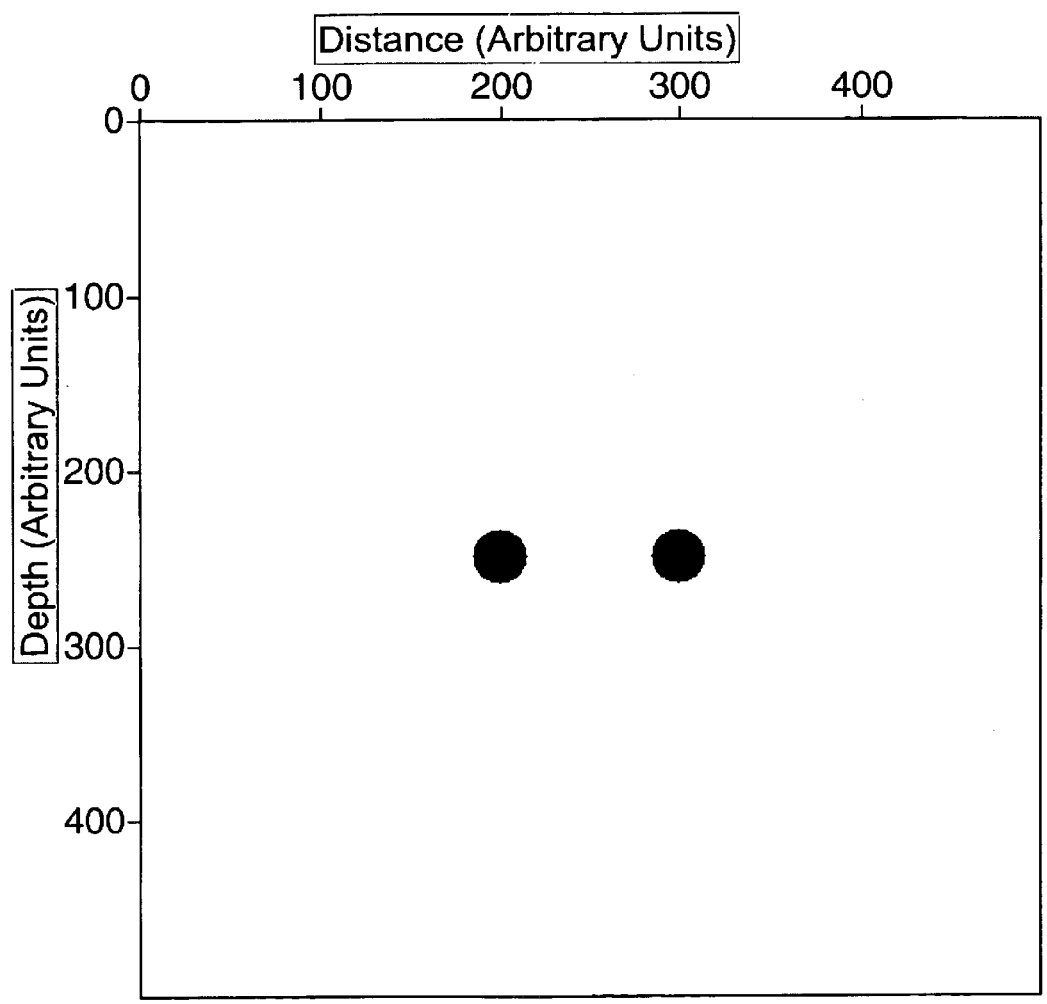
FIG. 7 illustrates an Earth velocity model for a further example of the implementation of an embodiment of the present method.
Figure 8:
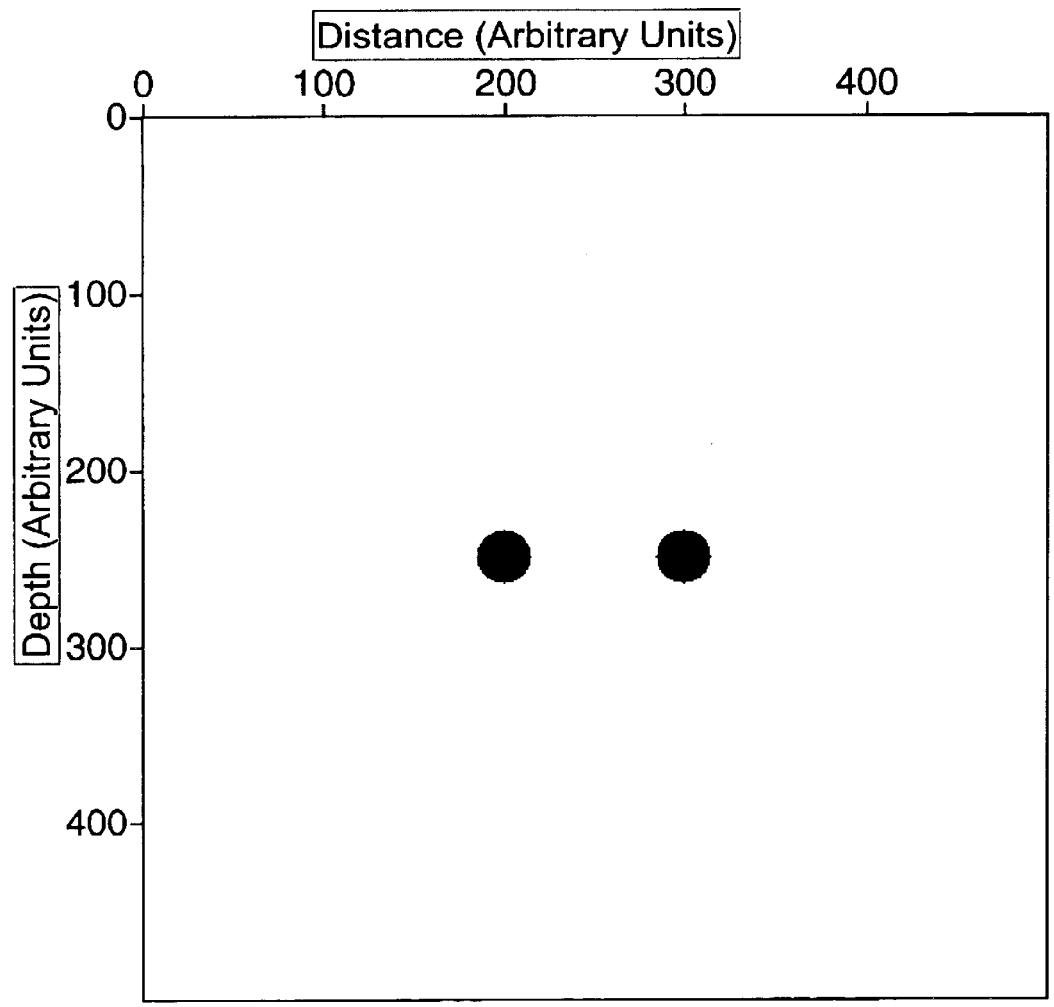
FIG. 8 depicts the velocity model of FIG. 7 although at a different time with the velocity of acoustic waves through a right hand circle depicted in the model has been modified.
Figure 9:
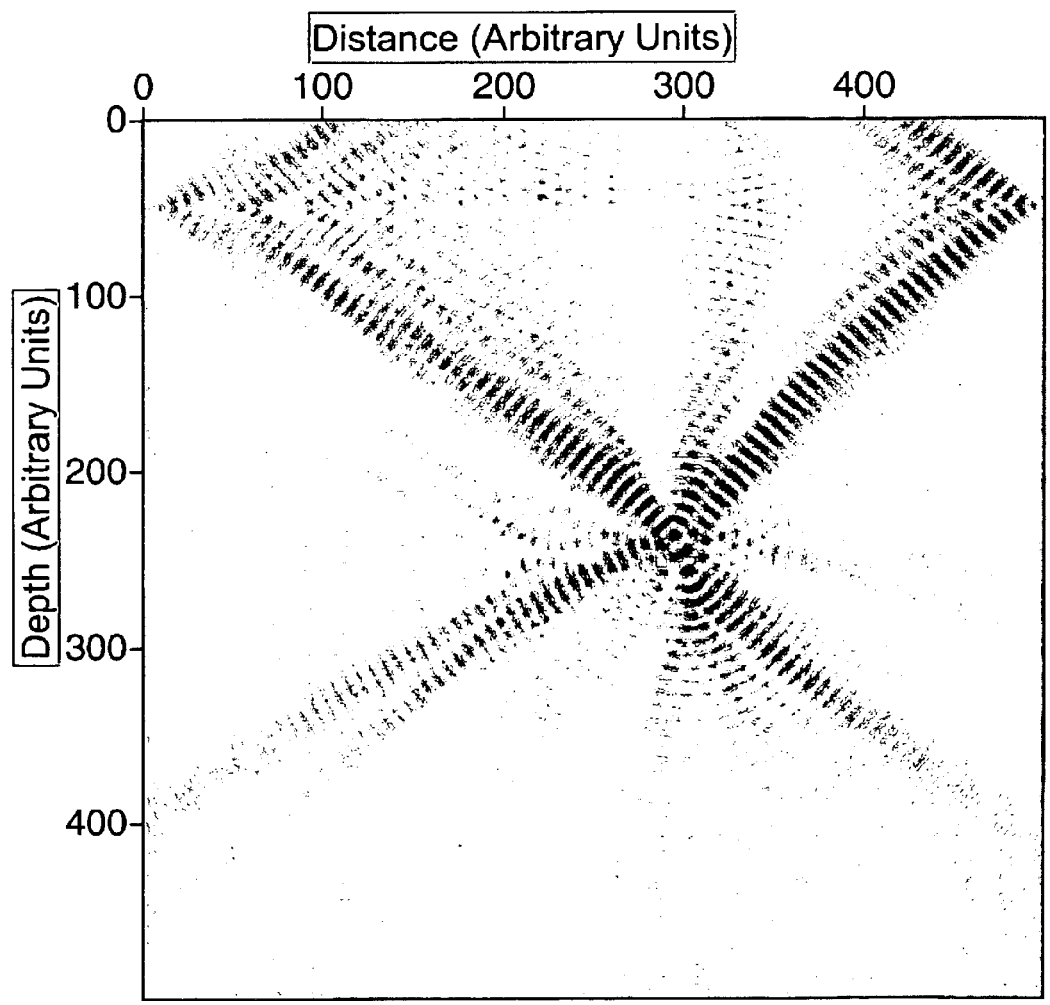
FIG. 9 illustrates an equilibrium backpropagated wavefield for the velocity model shown in FIG. 7 with a frequency of 200 Hz.

Two further examples of an embodiment of the present method, performed by numerical modelling, are now described with reference to FIGS. 7–16. Each example comprises two models with a small difference in their velocity fields. In example A the subsurface is modelled as having a uniform background velocity of 1500 mS$^{-1}$ with two circles with different velocities of 2000 mS$^{-1}$ in an unmodified form (i.e. at a time T) and in modified (i.e. time T+Δ) form the right hand circle has a velocity of 2500 mS$^{-1}$. These are illustrated in FIGS. 7 and 8.

Figure 12:
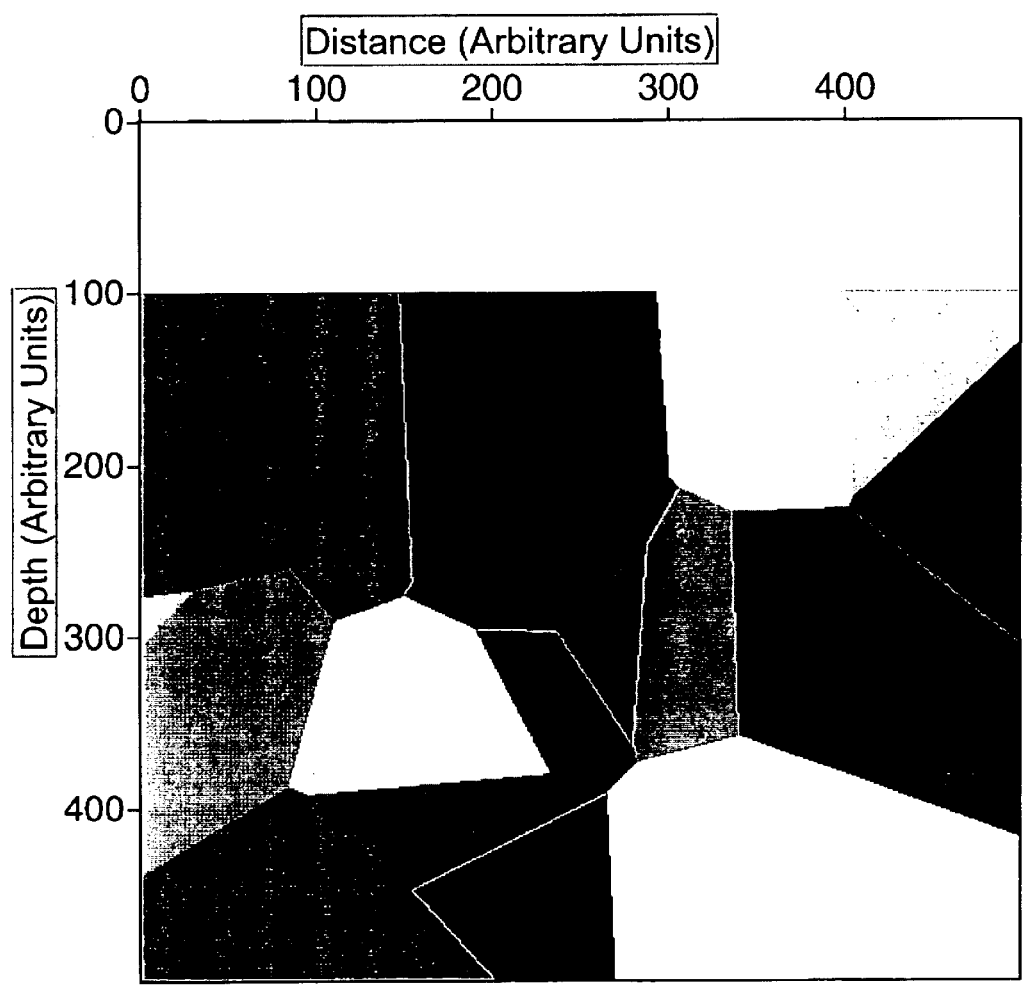
FIG. 12 depicts a granular velocity model used for describing a further example of the implementation of the method according to the present invention.
Figure 13:
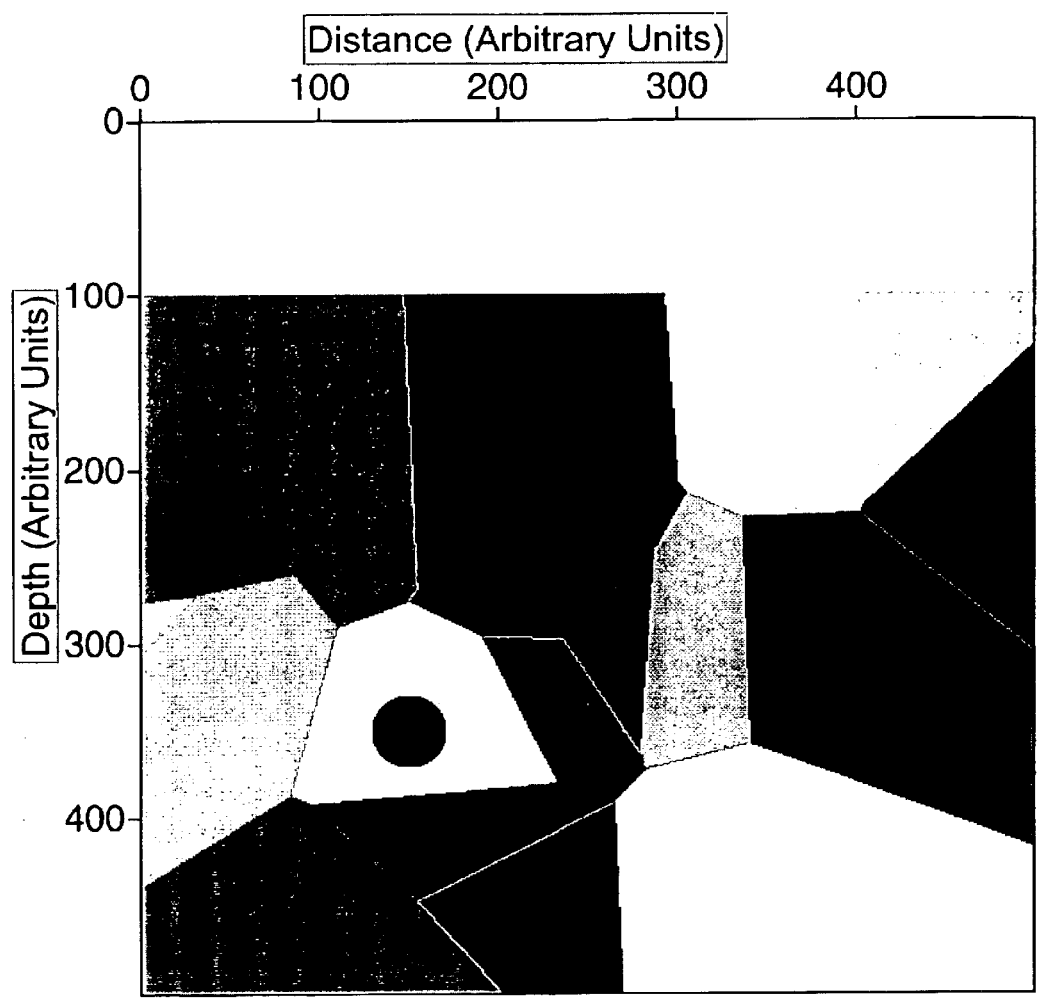
FIG. 13 illustrates the velocity model of FIG. 12 with the introduction of a modified velocity in a circular area at grid location 150, 350.

In example B the subsurface is modelled as having a variable granular velocity at time T and this is illustrated in FIG. 12. At time T+Δ the model is modified by the inclusion of a circle with a modified velocity as shown in FIG. 13.

The changes in the models between times T and T+Δ could represent for example changes attributable to the extraction of oil from the subsurface. Both examples are modelled numerically. The grid size for the modelling is 500×500 scaled to meters.

Both these examples were modelled by numerical finite difference methods simulating a sinusoidal source of continuous acoustic wave placed at grid position {225,50}. The numerical model was run for sufficient time to give a steady state wavefield solution and the wavefield was sampled along a line of recorders placed at grid positions {1–500, 50}.

For both examples the propagation of waves through the unmodified and modified velocity fields were modelled and the difference in the recorded wavefield determined. This differenced signal was time reversed (phase conjugated) and then used as a source signal at the previous recorder positions. The velocity model used in this backpropagation was the unmodified example in each case.

A range of frequencies was used in this simulation. Eleven different sinusoidal source signals were used ranging from 100 Hz to 400 Hz in geometric progression. For each frequency the backpropagation showed strong focussing onto the region where the Examples had been modified.

Figure 10:
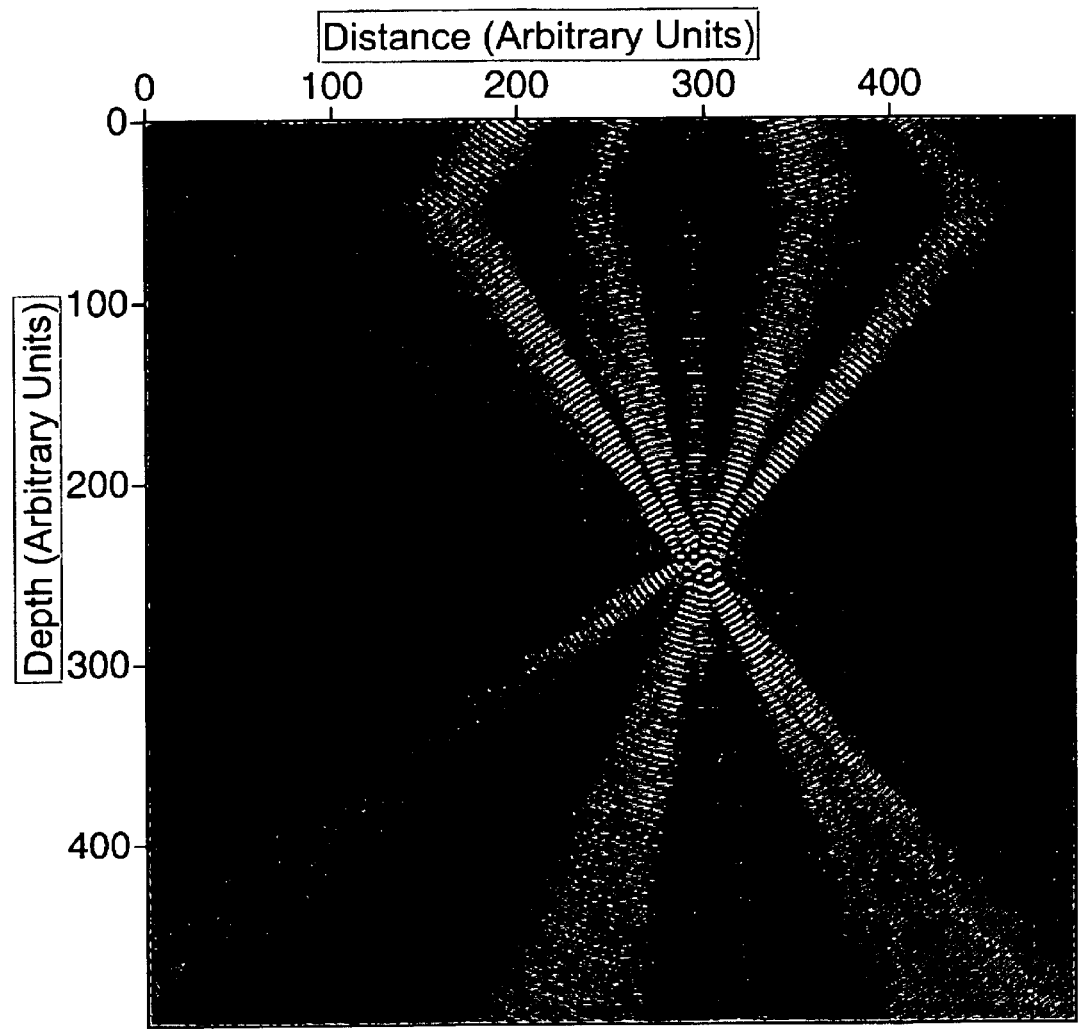
FIG. 10 illustrates an equilibrium backpropagated wavefield for the model depicted in FIG. 7 with a frequency of 400 Hz.
Figure 11:
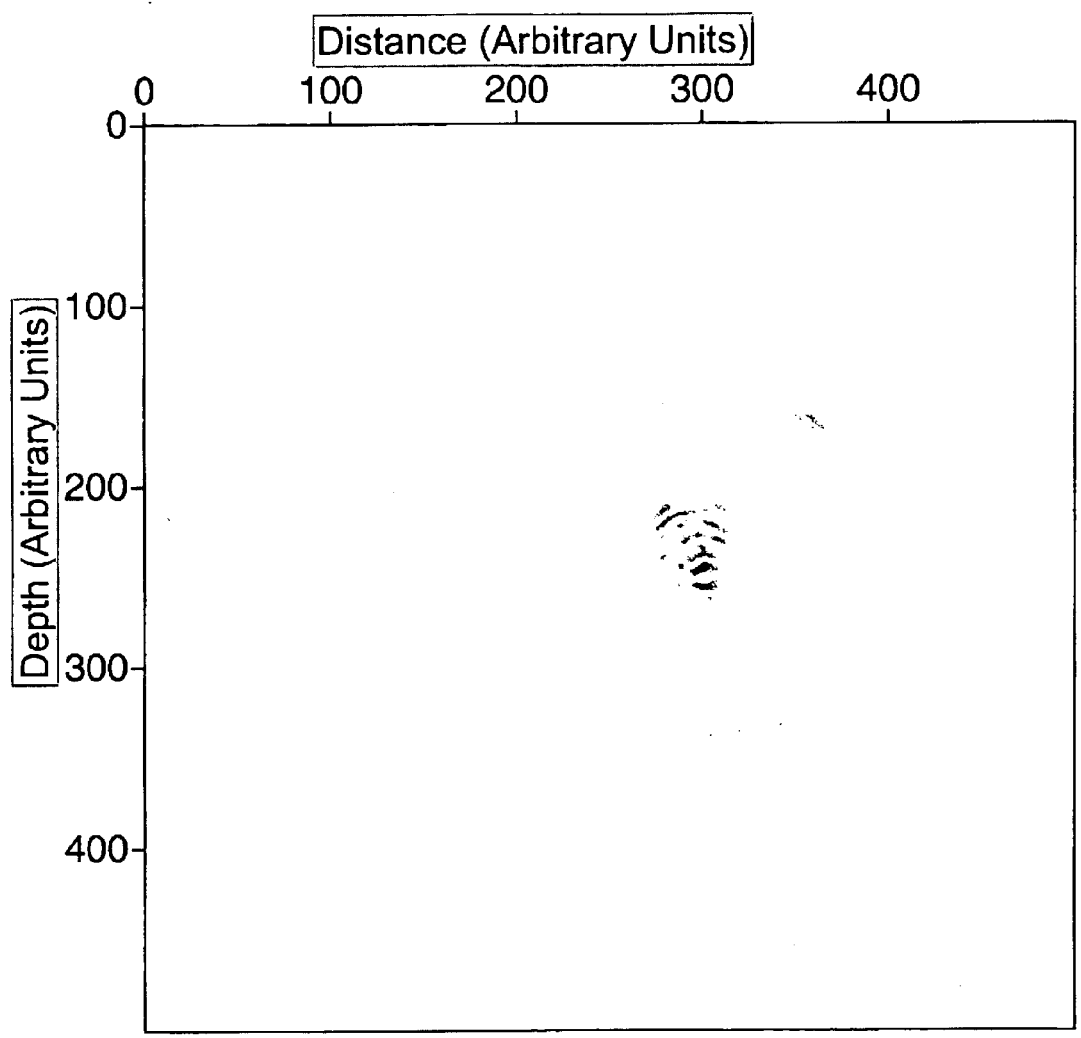
FIG. 11 depicts an equilibrium backpropagated energy field for the velocity model of FIG. 7 with mixed frequencies of 100–400 Hz.
Figure 14:
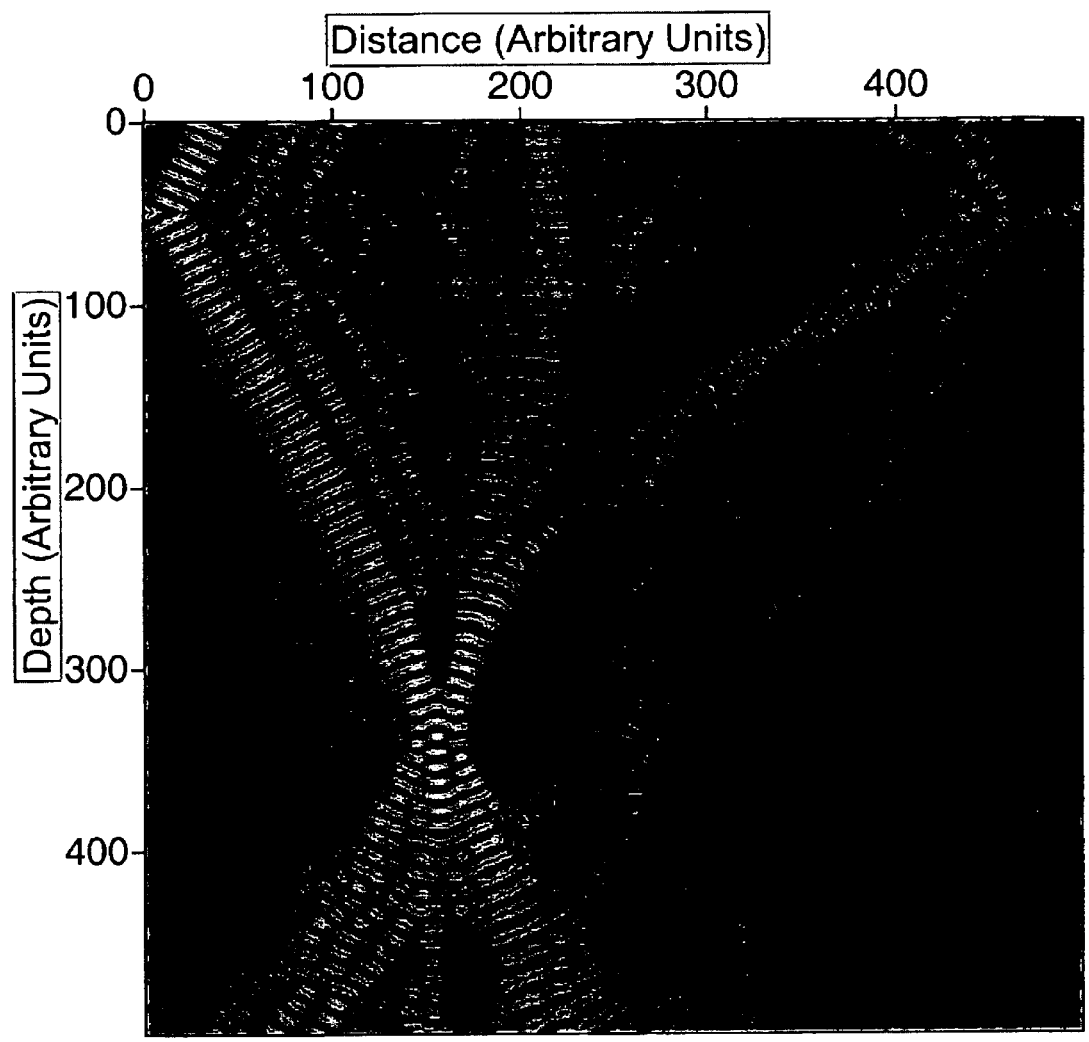
FIG. 14 illustrates an equilibrium background propagated wavefield for the model depicted in FIG. 13 with a frequency of 200 Hz.
Figure 15:
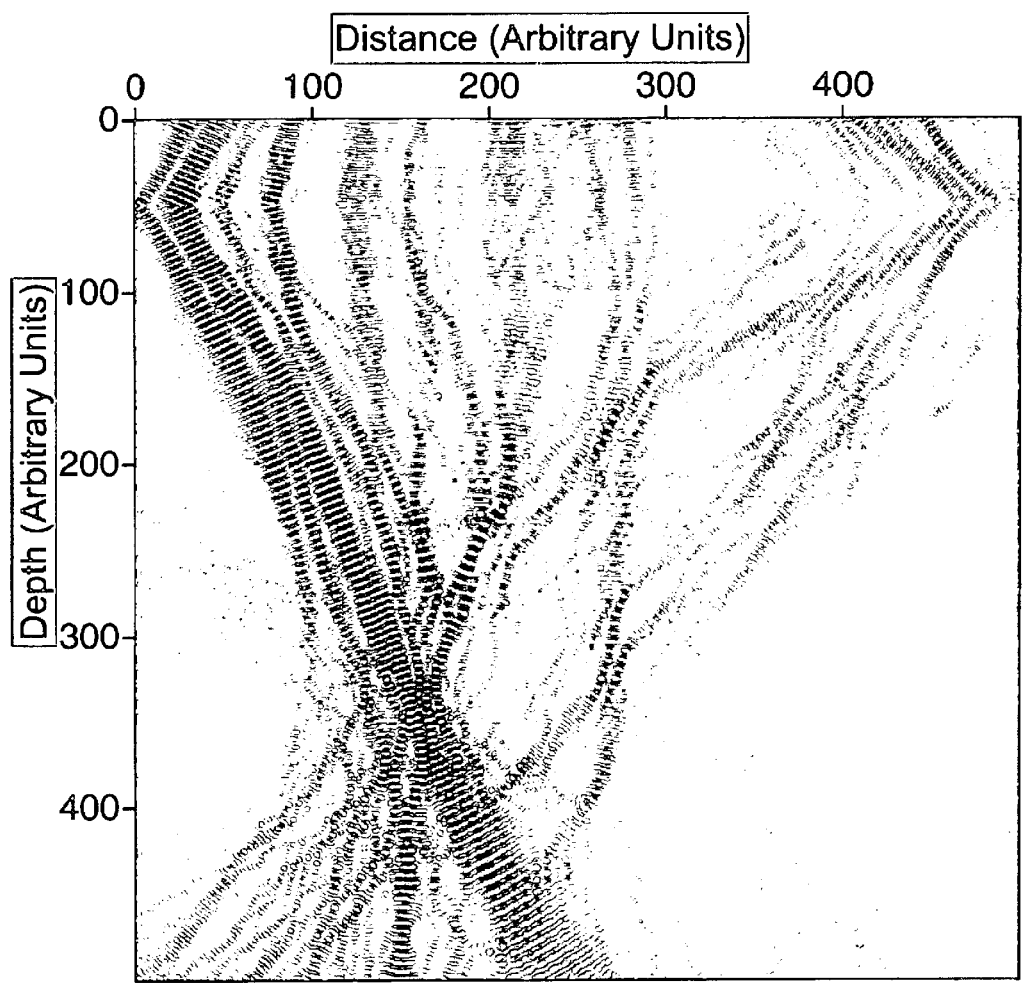
FIG. 15 illustrates an equilibrium backpropagated wavefield for the velocity model of FIG. 13 with a frequency of 400 Hz; and, FIG. 16 illustrates an equilibrium backpropagated energy field for the model in FIG. 13 with mixed frequencies of 100–400 Hz.

FIGS. 10 and 11 show the focussing for Example A at frequencies of 200 Hz and 400 Hz. FIGS. 14 and 15 show the focussing for Example B at the same frequencies.

These figures show the equilibrium wavefield at those two frequencies but the amplitudes are not well illustrated.

Figure 16:
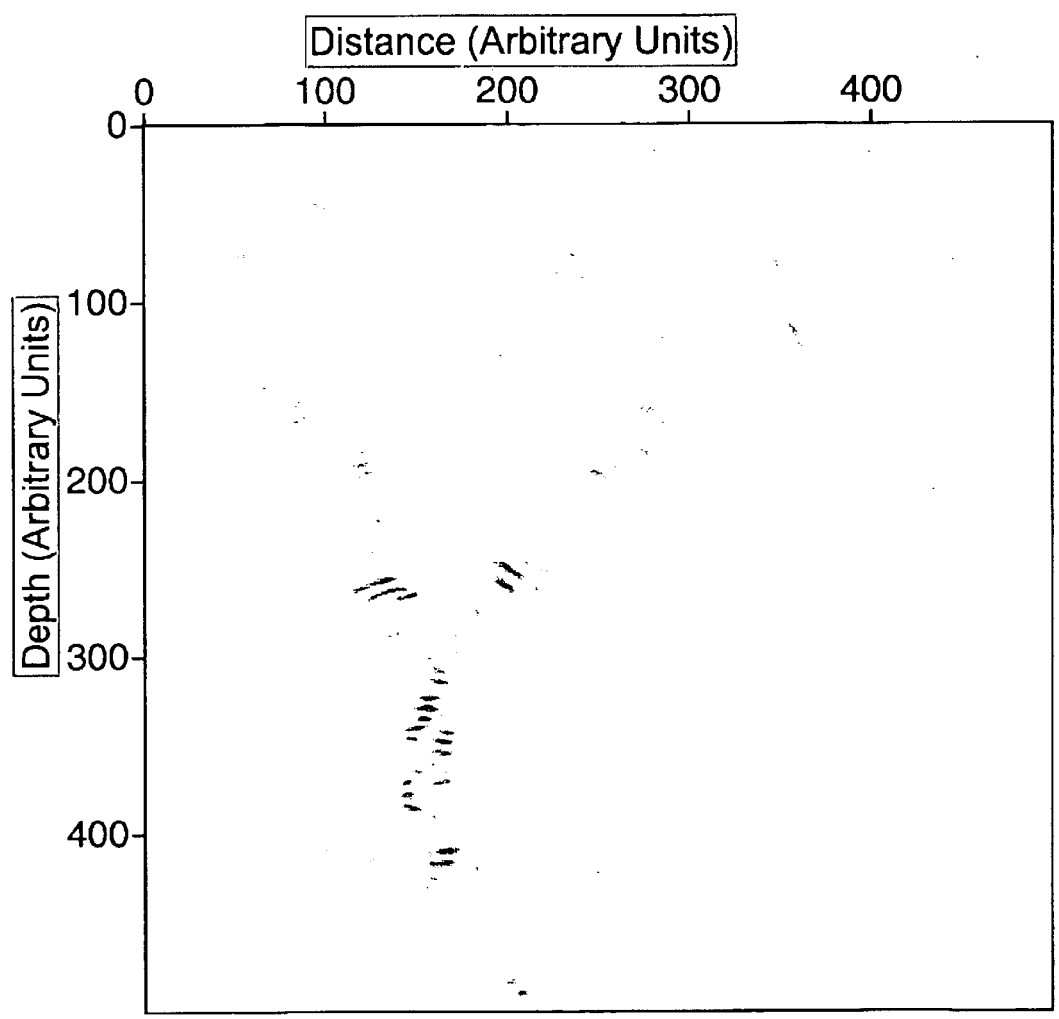

In order to better observe the amplitudes of the back-propagated signals the energy in the wavefield was calculated. This energy was calculated from the steady state wavefield using all frequencies used in the modelling. The energy is found by squaring the instantaneous amplitudes. FIGS. 11 and 16 show wave-field energy from the sum of all frequencies with unweighted amplitudes but limited by clipping the energy at the level of 1.5 units. It is clear that there is intensive focussing of the waves where modifications to the velocities were made. This is more apparent considering the maximum squared amplitude in those regions was over 100.

These two examples show that strong focussing occurs at the location of the modified velocities i.e. where changes have occurred in the velocity of acoustic waves in the method due to simulated variations in the modelled subsurface. The method will also work for more complex models and, it is believed, may work more effectively in multi-scattering media where the multiple scattering effectively increases the numerical aperture of the source array used for back-propagation. In multi-scattering media, therefore, fewer recording locations may be used without compromising the focus onto the modified region of the model.

It is proposed that embodiments of the present method could be applied to imaging the changes which take place in the subsurface when oil or gas is progressively extracted from reservoirs or where $CO_2$ flooding is used in the secondary recovery of oil. In seismic exploration the result of the data processing is an image of the subsurface. This image amounts to a type of velocity map of the geology and indeed velocity analysis is a key element in imaging the subsurface.

If an array of detectors together with a continuous acoustic source is set up above a reservoir, changes which take place in that reservoir will be reflected in changes in amplitude and phase of the recorded signals. High sensitivity detectors can be used and, since integration time can be extended, low power sources can be used. It is proposed that the returned signal be recorded using lock-in amplifier techniques. These could be dedicated instruments or alternatively the signals can be digitised and the phase of the reference signals also recorded so that the exact phase relationship between the returned signal and the reference signal can be accurately determined.

Since lock-in amplifier techniques are frequency selective it would be possible to have several acoustic sources operating at different frequencies and record all frequencies in the same detectors. The phase and amplitudes at all frequencies could then be extracted from the same received signal.

In a similar way the acoustic source could be designed to transmit all required frequencies simultaneously. With sufficient number of frequencies and if the frequencies have random phase relationships the source signal would simulate white or coloured noise. Provided the phases of all component frequencies are known, this would not compromise the recording of each frequency separately.

Since lock-in amplifier techniques are highly frequency selective it would be possible to have adjacent source/receiver combinations operating at slightly differing frequencies without them interfering. For example one set of frequencies could be say 11, 17, 23 31 Hz whilst an adjacent source receiver combination, designed to examine a different area of the reservoir, could be set to frequencies of 13, 19, 29, 37 Hz.

It is also considered likely that acoustic sources and receivers could be made small enough to be placed down boreholes or production wells in order to be closer to the regions where the changes in the reservoirs will take place. This would give greater sensitivity to the changes by reducing the effects of the overlying layers of the Earth.

A further refinement would be to make both source and receivers directional so that signals of specific polarity or direction of transmission or arrival were selected. This could be done by designing the sources or receivers themselves as arrays to select or create signals which match the desired parameters for transmission or detection angle.

The above described embodiments illustrate use of the present invention for determining or imaging changes in geological bodies. However, in a more basic form, an embodiment of the present invention may be used for simple examination of a body rather than for detecting or imaging changes in time, provided of course, that the body contains some form of inhomogeneities, layers or other boundaries which form reflectors, such as may be the case in examining the human body. As with the previously described embodiments above, N different orthogonal signals are transmitted in the body from sources placed at different locations and M receivers are provided for receiving those signals with directly and after reflection from reflectors within the body. These sources are run continuously at low power and the receivers are operated to record continuously or at least for such time as is required to enable the signals from each source at each receiver to be distinguished. The recorded signals at each receiver are then analysed by means of crosscorrelation with the signals from any of the sources and summed so that the signals from each source at each receiver can be separated in a similar manner as described hereinabove. The basic form of the analysis is determining the traveltime for each signal after reflecting from a reflector within the body. Traveltimes can then be used to produce images of the body in a similar manner as described above.

It should be recognised that by repeating this "examination" at two different times, while maintaining the location of the signal sources and receivers, one can detect any changes in the body by the process of subtracting the respective traveltimes at the two different times and then processing the differenced signal in the manner described above in relation to the embodiments as shown in FIGS. 1–16.

From the above description, it will be apparent to those skilled in the relevant arts that embodiments of the present invention have numerous benefits and advantages over the prior art. These include, but are not limited to, the ability to provide reliable precise re-surveying of geological formations due to the ability to provide continuous low power signals at fixed locations. A further benefit and consequence of the use of low power signals is that signal distortion and thus non-linear effects can be minimised.

Now that embodiments of the present invention have been described in detail, it will be apparent to those skilled in the relevant arts that numerous modifications and variations may be made without departing from the basic inventive concepts. For example, in the above described embodiments, it is assumed that each of the signals is transmitted from a single dedicated signal source. However, the same effects may be obtained by generating a single composite signal by summing each of the N signals and then transmitting the composite signal from a single transmitter. In this embodiment, in order to determine travel-time of a particular component signal of the composite signal, the signal received at a particular receiver is summed for the repeat length of that component signal. Due to the orthogonal nature of the component signals this will result in the other component signals received at that receiver summing to zero, i.e. effectively being cancelled. To complete travel-time determination, the summed signal at each receiver is then correlated with the component signals constituting the single signal. All such modifications and variations together with others that would be obvious to a person of ordinary skill in the art are deemed to be within the scope of the present invention, the nature of which is to be determined from the above description and the appended claims.

What is claimed is:

1. A method of examining a physical body comprising:
    forming N continuous orthogonal signals where N is an integer $1 \geq 1$ by, for each said N signals, summing a plurality of constituent sine waves to together, where each of said sine waves has a known and mutually exclusive frequency and, said sine waves have a random or pseudo-random phase, and wherein n two of said N signals includes constituent sine waves of the same frequency; transmitting said N signals into said physical body;
    providing M receivers for receiving said continuous signals including reflections of said continuous signals from one or more reflectors within said body and recording said received signals at each of said M receivers;
    determining a travel-time to the reflectors for each of said N signals at said M receivers by cross correlating each of said N signals with each of said recorded signals at said M receivers; and,
    deriving an image of said physical body from said determined travel-times.

2. The method according to claim 1 wherein each of said constituent sine waves has a prime number integer frequency.

3. The method according to claim 2 further including the step of scaling the frequencies of said constituent sine waves to a predetermined bandwidth.

4. The method according to claim 3 further including the step of forming each of said N signals with an extended repeat length.

5. The method according to claim 4 further including the step of forming each of said N signals with a different repeat length.

6. The method according to claim 5 wherein the phases of each of the component sine waves are arranged such that frequencies in any of the N signals will not have a phase which causes large reinforcements of amplitude at any time within the repeat length of the N signals.

7. The method according to claim 1 wherein said step of cross correlating includes cross correlating said respective signals using a correlation window of a width greater than one half of the repeat length of the shortest repeat length of said signals and summing said windowed correlations for a length equal to the product of the repeat lengths of said N signals.

8. The method according to claim 2 wherein said step of determining travel-time includes, for each recorded signal, windowing said recorded signal, cross correlating said recorded signal with each of said N signals, and summing separate windows of said recorded data.

9. The method according to claim 1 wherein said step of determining travel-time includes at each of said M receivers, windowing the recorded data, summing said recorded data for the repeat length of the Nth signal and cross correlating said summed record with said source signal.

10. The method according to claim 1 wherein the step of transmitting said N signals includes summing each of said N signals to form a composite signal and transmitting said composite signal from a single signal source.

11. The method according to claim 10 wherein said step of determining travel-time includes, for a particular one of said N signals constituting said composite signal;
    summing said received signal at each of said M receivers for a repeat length of said particular one of said N signals; and,
    correlating said summed signal with said particular one of said N signals.

12. A method of detecting changes in a physical body comprising:
    forming N continuous orthogonal signals where N is an integer $\geq 1$ by, for each of said N signals, summing a plurality of constituent sine waves together, where each of said sine waves has a known and mutually exclusive frequency and, said sine waves have a random or pseudo-random phase, and wherein no two of said N signals includes constituent sine waves of the same frequency; transmitting said N signals into a body;
    providing M receivers for receiving said continuous signals including reflections of said continuous signals from one or more reflectors within said physical body;
    recording said received continuous signals at said M receivers times T and T+Δ; and,
    deriving M differenced signals by subtracting said recorded signals at time T from said recorded signal at time T+Δ to provide an indication of changes in said physical body, based on said M differenced signals.

13. The method according to claim 12 comprising analysing said differenced signals in amplitude and phase.

14. The method according to claim 13 further comprising back propagating said differenced signal to produce an image in time of changes in said body.

15. The method according to claim 14 wherein back propagation can be achieved by phase conjugation of the differenced signal which is equivalent to time reversal.

16. The method according to claim 12 further comprising providing a velocity field of said body, and back propagating said differenced signal through said velocity model to produce a spatial image of the changes in said body.

17. The method according to claim 16 wherein each of said constituent sine waves has a prime number integer frequency.

18. The method according to claim 17 further comprising the step of scaling the frequencies of said constituent sine waves to a predetermined bandwidth.

19. The method according to claim 18 further comprising the step of forming each of said N signals with an extended repeat length.

20. The method according to claim 19 further including the step of forming each of said N signals with a different repeat length.

21. The method according to claim 20 wherein the phases of each of the component sine waves are arranged such that frequencies in any of the N signals will not have a phase which causes large reinforcements of amplitude at any time within the repeat length of the N signals.

* * * * *